(12) United States Patent
Park

(10) Patent No.: US 11,809,002 B2
(45) Date of Patent: Nov. 7, 2023

(54) OPTICAL MODULE WITH ANGLED LATCH PLANE

(71) Applicant: Arista Networks, Inc., Santa Clara, CA (US)

(72) Inventor: Youngbae Park, Milpitas, CA (US)

(73) Assignee: Arista Networks, Inc., Santa Clara, CA (US)

( * ) Notice: Subject to any disclaimer, the term of this patent is extended or adjusted under 35 U.S.C. 154(b) by 22 days.

(21) Appl. No.: 17/483,927

(22) Filed: Sep. 24, 2021

(65) Prior Publication Data
US 2023/0095499 A1 Mar. 30, 2023

(51) Int. Cl.
*G02B 6/42* (2006.01)

(52) U.S. Cl.
CPC ........... *G02B 6/4261* (2013.01); *G02B 6/428* (2013.01)

(58) Field of Classification Search
CPC .. G02B 6/4261; G02B 6/4292; G02B 6/4201; G02B 6/4246; G02B 6/3893
See application file for complete search history.

(56) References Cited

U.S. PATENT DOCUMENTS

| | | | | |
|---|---|---|---|---|
| 7,077,578 B2* | 7/2006 | Lee | ....................... | G06F 1/1632 385/88 |
| 10,078,188 B1* | 9/2018 | Wong | ..................... | G02B 6/381 |
| 2003/0214789 A1* | 11/2003 | Medina | ................ | G02B 6/4284 361/729 |
| 2005/0260880 A1* | 11/2005 | Seo | ....................... | G02B 6/4292 439/372 |
| 2015/0263453 A1* | 9/2015 | Wang | ................... | G02B 6/3893 385/76 |

OTHER PUBLICATIONS

Brian Park et al., "OSFP Octal Small Form Factor Pluggable Module", Rev 3.0, retrieved from www.osfpmsa.org, OSFP MSA Confidential, Mar. 14, 2020 (99 pages).

* cited by examiner

*Primary Examiner* — Michelle R Connelly
(74) *Attorney, Agent, or Firm* — Tianyi He

(57) ABSTRACT

A pluggable optical module includes: a casing with an internal space; a latching pocket disposed on a side wall of the casing; and a latch plane on a surface of the latching pocket. The surface is a beveled surface, and the beveled surface delimiting the latch plane has an angle of between 3 to 15 degrees.

19 Claims, 4 Drawing Sheets

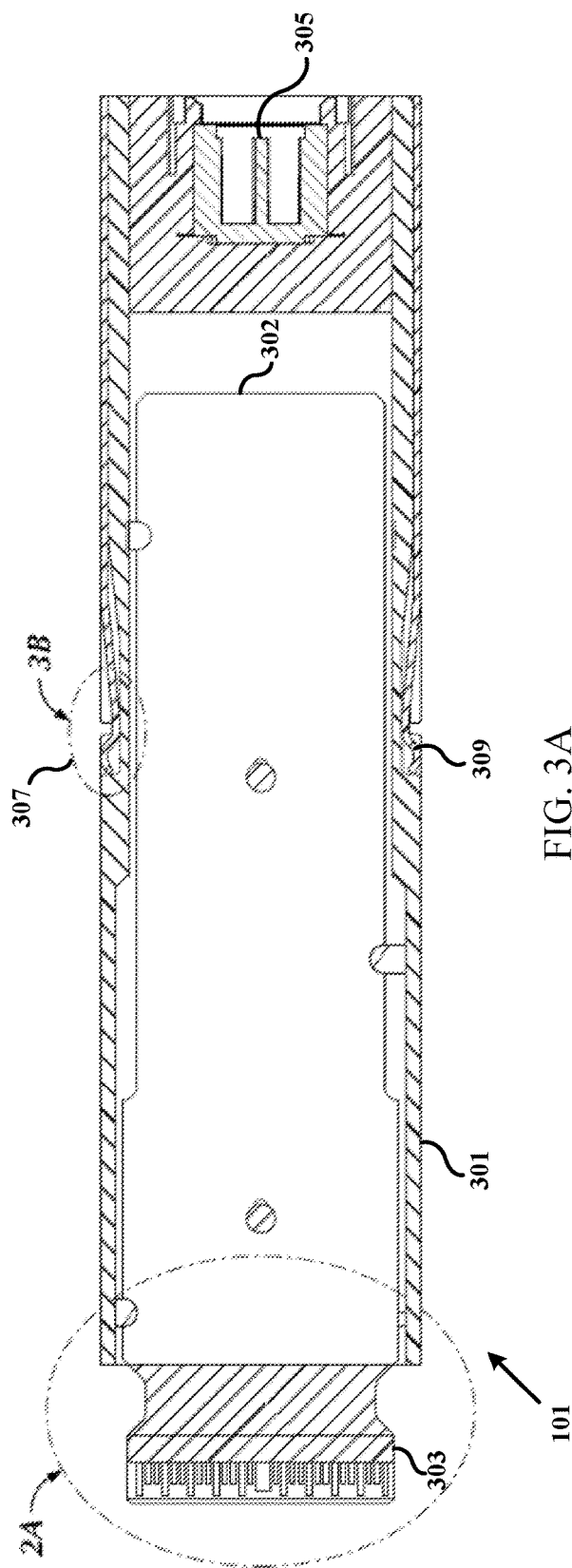
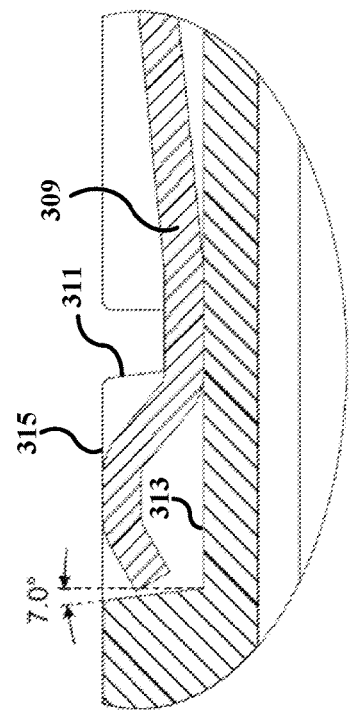
FIG. 3A
FIG. 3B

OPTICAL MODULE WITH ANGLED LATCH PLANE

BACKGROUND

Optical communications are used to transmit large amounts of data at very high data transmission rates. When communicating by an optical network, network devices such as servers, routers, and switches must convert electronic signals used to process information to optical signals for transmission. An optoelectronic transceiver may be used to convert electrical signals to optical signals and the reverse.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3A shows a top view of the pluggable optical module of FIG. 1 without the cage.

FIG. 3B shows an enlarged view of a latching pocket of the pluggable optical module of FIG. 3A.

DETAILED DESCRIPTION

One or more embodiments disclosed herein are directed to a pluggable optical module. In particular, to mate with an electrical connector located in a cage, for example, a cage mounted in a networking device such as a switch or router, a pluggable optical module (e.g., Octal Small Form Pluggable (OSFP) modules, Quad Small Form-factor Pluggable (QSFP) modules, and Quad Small Form-factor Pluggable Double Density (QSFP-DD) modules, etc.) has a protruded printed circuit board (PCB) with contact pads. This protruded PCB has a pad length including: at least two manufacturing variances, a module front-to-back nominal clearance, and a safety margin. Making this pad length shorter can improve the signal integrity of the pluggable optical module. For example, for QSFP modules, a pad length of 1.60 mm provides 28 Gbp/s data rate per signal lane while a shorter pad length of 1.40 mm provides 112 Gbp/s data rate per signal lane.

The module front-to-back nominal clearance in most pluggable optical modules has been 0.21 mm. This module front-to-back nominal clearance can be decreased by controlling a latch that retains the module within the cage. In particular, a modification in the latch plane geometry of the pluggable optical module can achieve at least a 0.064 mm reduction in module front-to-back nominal clearance. Although this at least 0.064 mm reduction used to be ignorable, recent improvements in the industry (e.g., the adoption of 50 Gbp/s data rate per signal lane) has made this at least 0.064 mm reduction a criticality for pluggable optical modules.

To achieve such a criticality of reducing the module front-to-back nominal clearance by at least 0.064 mm, in one or more embodiments, a latch plane on an outside wall of the pluggable optical module that mates with a cage latch is configured to be angled at an angle between 3 and 15 degrees. In particular, a pluggable optical module's latch plane geometry may include a latching pocket and a latch release mechanism. This latching pocket is a cutout on a surface of the module wall. A surface of the cutout is a latch plane that engages with a front terminal end of a latch of the cage when the pluggable optical module is inserted into the cage. This latch plane is configured to include the 3 to 15 degree angle with a nominal angle being at 7 degrees.

For example, in one or more embodiments, the addition of the 7 degree angle reduces a clearance between a latch and one of the two module outside walls from 0.21 mm to 0.146 mm, which results in the at least 0.064 mm reduction in the module front-to-back nominal clearance. With the reduction in the module nominal clearance, the signal integrity of the pluggable optical module can be greatly improved without sacrificing the module retention capabilities of the latch.

Various embodiments discussed above are now described in more detail below.

Figure 1:
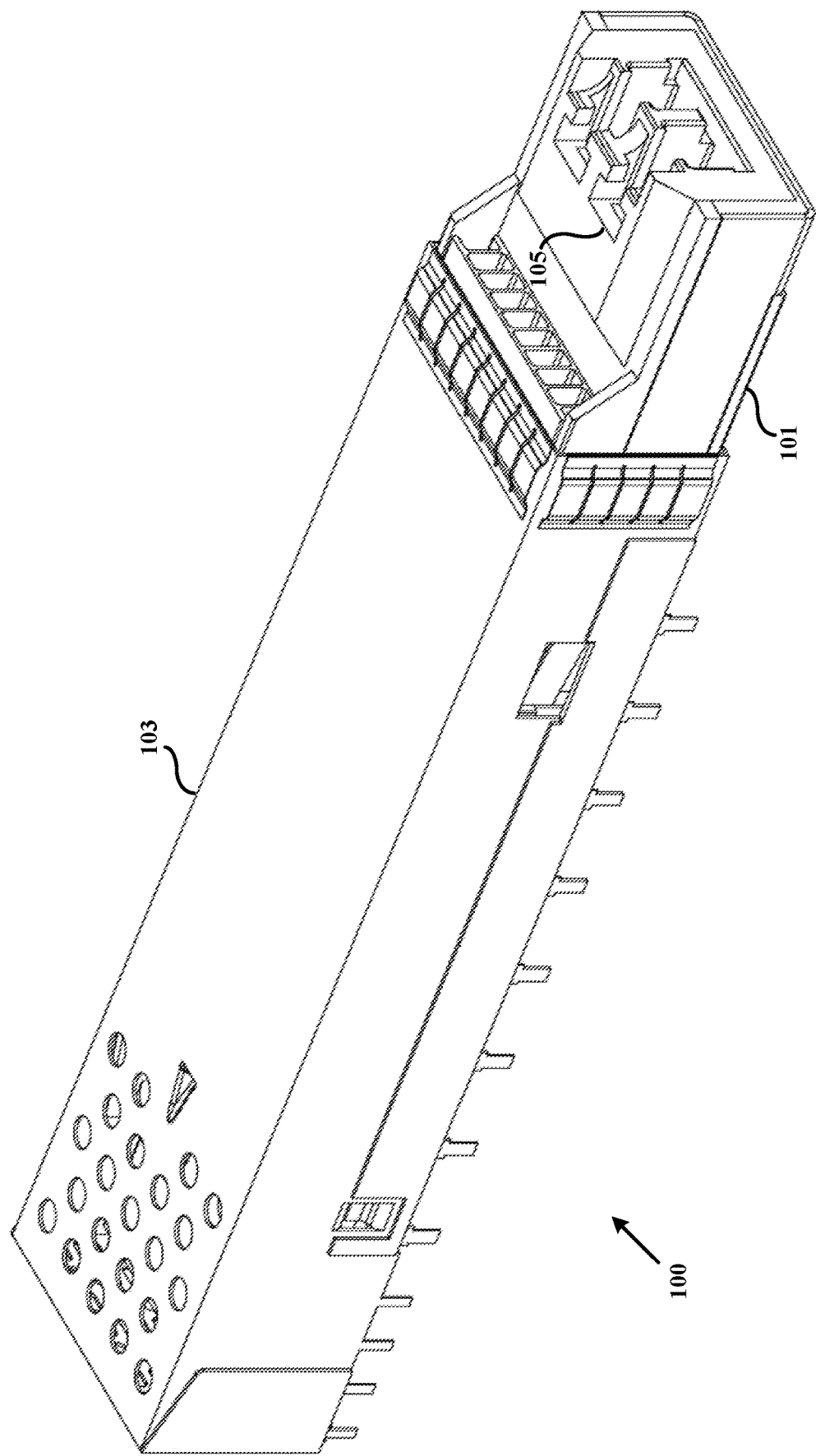
FIG. 1 shows a perspective view of a pluggable optical module according to one or more embodiments that is installed within a cage.

FIG. 1 shows pluggable optical module cage combination (100) that includes a pluggable optical module (101) that is installed within a cage (103). The pluggable optical module (101) may convert electrical signals to optical signals, and the reverse.

In one or more embodiments disclosed herein, the cage (103) may be a housing configured to house circuitry (not shown) of the pluggable optical module (101). The cage (103) may be a metallic material (e.g., copper alloy or steel), and is configured to hold the pluggable optical module (101) in-place within an internal space of the cage.

In one or more embodiments disclosed herein, the pluggable optical module (101) may include a plurality of cable ports (105) configured to receive a cable (not shown) from an external device and/or an optical network. The cable ports (105) may be a part of a fiber optical connection of the pluggable optical module (101). The circuitry of the pluggable optical module (101) may receive and/or transmit optical signals using the fiber optical connection.

In one or more embodiments disclosed herein, the pluggable optical module (101) shown in FIG. 1 is an Octal Small Form Pluggable (OSFP) module. However, one or more embodiments disclosed herein is not limited to OSFP modules. Any other types of modules (e.g., Quad Small Form-factor Pluggable (QSFP) modules, and Quad Small Form-factor Pluggable Double Density (QSFP-DD) modules, etc.) utilizing a similar module and cage structure combination may be used without departing from the scope of one or more embodiments.

Figure 2A:
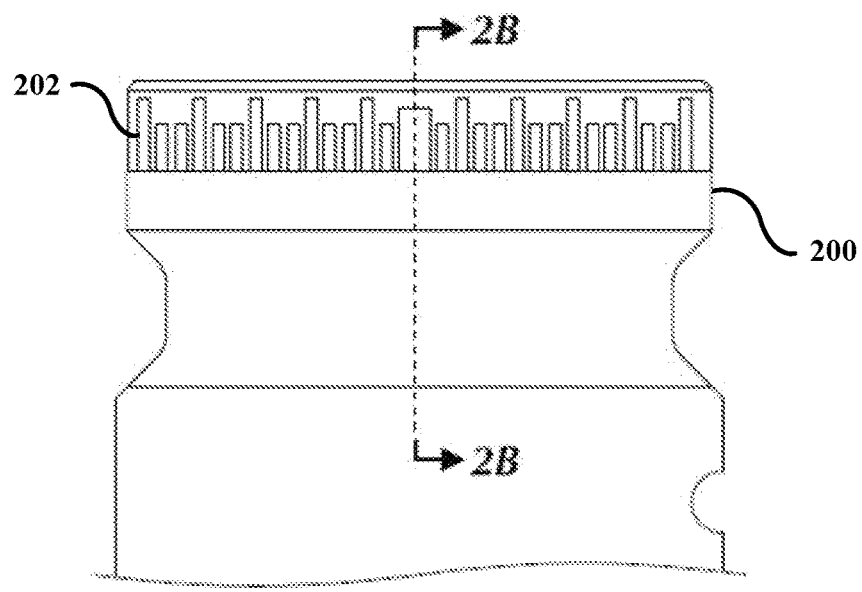
FIG. 2A shows an optical connector of the pluggable optical module of FIG. 1.

FIG. 2A shows an electrical connector (200) of the pluggable optical module of FIG. 1. The electrical connector (200) is disposed on an opposite end from the plurality of cable ports (105) of the pluggable optical module (101), which is shown more clearly in FIG. 3A discussed below. The electrical connector (200) may be a printed circuit board (PCB).

In one or more embodiments disclosed herein, the electrical connector (200) includes a plurality of contact pads (202) configured to contact respective electrical connectors disposed within the cage (103). This allows the electrical connector (200) to be connected to, for example, a circuit card of a network device through the cage (103). As a non-limiting example, for OSFP modules, each of the contact pads (202) are 0.38 mm in width and 1.5 mm in length.

Figure 2B:
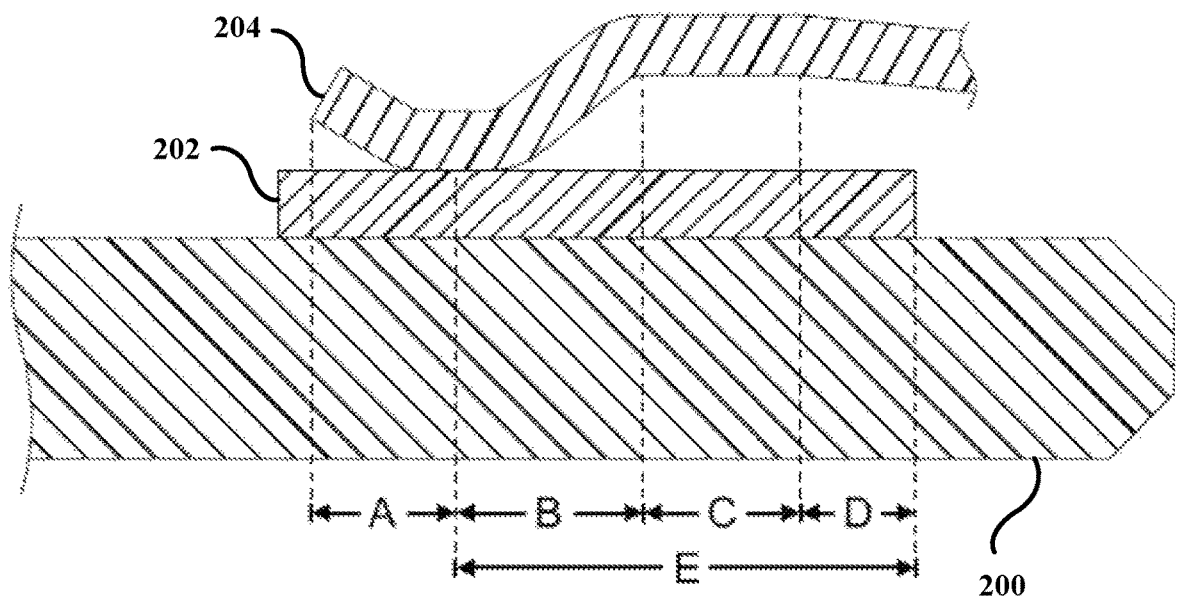
FIG. 2B shows a mating between the electrical connector of FIG. 2A with an electrical connector of the cage.

Turning now to FIG. 2B, FIG. 2B shows a cross-section of one of the contact pads (202) of the electrical connector (200) shown in FIG. 2A. A cross-section of part of the electrical connector (200) is also shown in FIG. 2B. Furthermore, FIG. 2B shows an electrical connector (204) disposed within a body of the cage (103) shown in FIG. 1. This electrical connector (204) enables the contact pad (202) of the electrical connector (200) to be connected to, for example, a circuit card of a network device through the cage (103).

As shown in FIG. 2B, a body of the electrical connector (200) includes a plurality of sections A through E that illustrate a pad tolerance of the electrical connector (200). This pad tolerance is provided to accommodate variances in the mating between the contact pad (202) and the electrical connector (204). The pad tolerance is also used to provide extra length in the electrical connector (200) to accommodate an insertion depth of the pluggable optical module (101) into the cage (103). As discussed above, minimizing this length (also referred to herein as a "pad length") of the electrical connector (200) can improve the signal integrity of the pluggable optical module. For example, for QSFP modules, a pad length of 1.60 mm provides 28 Gbp/s data rate per signal lane while a shorter pad length of 1.40 mm provides 112 Gbp/s data rate per signal lane.

In one or more embodiments disclosed herein, with respect to OSFP modules, sections A and C are manufacturing variances and may have a length of 0.55 mm. Section B is a module front-to-back nominal clearance that may have a length of 0.21 mm. Section D is a safety margin that may have a length of at least 0.1 mm. Section E is a nominal stub length that includes the lengths of sections B, C, and D. Other types of pluggable modules (e.g., QSFP modules QSFP-DD modules, etc.) may include similar or different lengths for each section of the pad tolerance of the optical connector (200).

In one or more embodiments disclosed herein, the module front-to-back nominal clearance length of Section B is used to control an insertion depth of the pluggable optical module (101) into the cage (103). For example, this front-to-back nominal clearance length allows the pluggable optical module (101) to wiggle slightly longitudinally back and forth within the cage (103) when the pluggable optical module (101) is inserted into the cage (103) and held by stop mechanisms (discussed below in more detail) of the cage (103). A reduction in this module front-to-back nominal clearance length of Section B advantageously results in a reduction of the pad length, which improves the signal integrity of the pluggable optical module.

Turning now to FIG. 3A, FIG. 3A shows a top view of the pluggable optical module (101) of FIG. 1 without the cage (103). As shown in FIG. 3A, in one or more embodiments disclosed herein, the pluggable optical module (101) includes a casing (301) with an internal space that houses a printed circuit board (PCB) (302). One longitudinal end of the PCB includes an electrical connector (303) (e.g., 200, FIG. 2A) with contact pads. At an opposite longitudinal end of the electrical connector (303), the casing (301) includes cable ports (305) (e.g., 105, FIG. 1) that are configured to receive an optical cable (not shown) from an external device and/or an optical network.

Additionally, in one or more embodiments disclosed herein, the casing (301) includes at least two latching pockets (307) disposed on opposite sides along longitudinal side walls of the casing (301). Each of the latching pockets (307) includes a latch release (309) that is configured to release a latch of the cage (103) that is configured to securely hold the pluggable optical module (101) within the cage (103). An enlarged view of a latching pocket (307) is shown in FIG. 3B, which is discussed in more detail below.

According to one or more embodiments disclosed herein, FIG. 3B shows an enlarged view of a latching pocket (307) of the pluggable optical module (101) of FIG. 3A. As shown in FIG. 3B, the latching pocket (307) includes the latch release (309) configured to engage with a latch of the cage (103) to release the pluggable optical module (101) from the cage (103). The latch of the cage is discussed in more detail below with reference to FIGS. 4A and 4B. As a non-limiting example, in one configuration of one or more embodiments, the latch of the cage (103) will be inserted into the latching pocket (307). Once inserted into the latching pocket (307), the latch will lock the pluggable optical module (101) into the cage (103).

In one or more embodiments disclosed herein, the latching pocket (307) also includes a latch plane (311) that extends from a bottom surface (313) of the latching pocket (307) to the top surface (315) of the latching pocket (307). This latch plane (311) may be a beveled surface connecting the top surface (315) to the bottom surface (313). The internal space of the latching pocket (307) is configured to receive the latch of the cage (103) to secure the pluggable optical module (101) within the cage (103). The configuration of the latch within the latching pocket (307) is shown in more detail in FIGS. 4A and 4B.

In one or more embodiments disclosed herein, the latch plane (311) may be angled away from vertical at an angle of between 3 and 15 degrees towards the bottom surface (313) of the latching pocket (307). For example, the angle may be represented by θ and the value of θ may be between three and 15 degrees ($3° \leq \theta \leq 15°$). In one or more embodiments, the angle may be 7 degrees.

Although FIG. 3B specifically shows the angle of the latch plane (311) as exactly 7 degrees, one of ordinary skill in the art would appreciate that the angle shown in FIG. 3B is just an example and should not be used to limit the scope of one or more embodiments. As discussed above, the latch plane (311) may be angled away from vertical at an angle of between 3 and 15 degrees towards the bottom surface (313) of the latching pocket (307). Advantages of having the latch plane (311) be angled away from vertical at an angle between 3 and 15 degrees are discussed in more detail below with reference to FIGS. 4A and 4B.

Figure 4A:
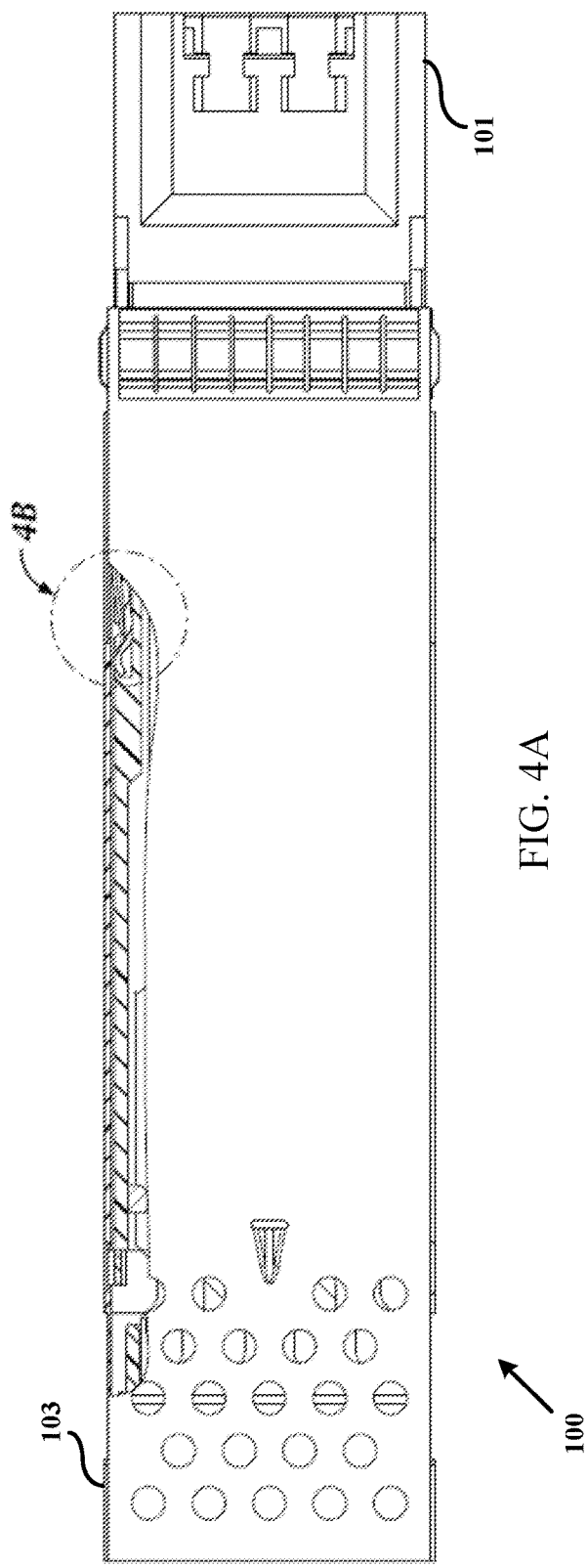
FIG. 4A shows a top view of the pluggable optical module cage combination of FIG. 1 with a cutout of a portion of the cage at the latching pocket area of the pluggable optical module.
Figure 4B:
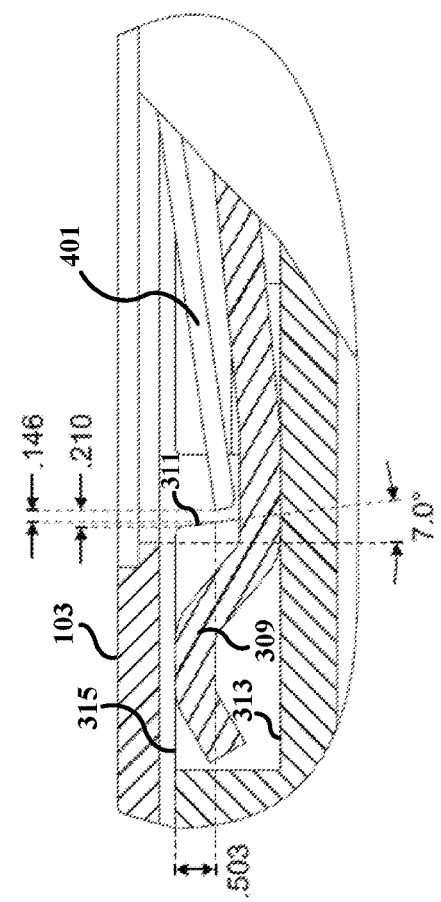
FIG. 4B shows an enlarged view of the latching pocket area circled in FIG. 4A where a latch of the cage mates with the latching pocket area of the pluggable optical module.

FIGS. 4A and 4B show a configuration where a latch (401) of the cage (103) is inserted within a latching pocket (307) of the pluggable optical module (101). More specifically, FIG. 4A shows a top view of pluggable optical module cage combination (100) of FIG. 1 with a cutout of a portion of the cage (103) at the latching pocket (307) area of the pluggable optical module (101).

Furthermore, in one or more embodiments disclosed herein, FIG. 4B shows an enlarged view of the latching pocket (307) area circled in FIG. 4A where a latch (401) of the cage (103) mates with the latching pocket (307) area of the pluggable optical module (101).

As shown in the enlarged view in FIG. 4B, a latch (401) of the cage is inserted within the latching pocket (307) of the pluggable optical module (101) when the pluggable optical module (101) is installed within the cage (103). In a fully installed state, the latch (401) is disposed over the latch release (309) of the latching pocket (307).

When the latch (401) is to be engaged with the latch plane (311), a clearance should be provided between the latch (401) and the latch plane (311). Due to manufacturing tolerances, conventionally, a clearance of 0.21 mm is required to guarantee that there will always be clearance between the latch (401) and latch plane (311) to be able to remove and insert the latch (401) within the latching pocket (307). In one non-limiting example where the latch (401) is fully inserted within the latching pocket (307), a front terminal end of the latch (401) is disposed at a depth of 0.503 mm from the top surface (315) of the latching pocket (307). As a result of the latch plane (311) being provided at an angle of, for example, 7 degrees, a latch clearance between the latch (401) and the latch plane (311) may be reduced from 0.210 mm to 0.146 mm as shown in FIG. 4B.

In one or more embodiments disclosed herein, the latch clearance of 0.21 mm guarantees sufficient clearance between the latch (401) and latch plane (311), and may only be reduced using tighter manufacturing tolerance if the latch plane (311) is not provided at an angle. Additionally, providing the latch plane (311) at an angle of 3≤θ≤15 advantageously reduces the module front-to-back clearance discussed above in reference to FIG. 2B without a risk of the latch (401) not engaging with the latching plane (311).

In one or more embodiments disclosed herein, having the latch plane (311) as a beveled surface that is angled away from vertical at an angle directly reduces a length of the module front-to-back nominal clearance length by at least 0.064 mm. Although this at least 0.064 mm reduction used to be ignorable, recent improvements in the industry (e.g., the adoption of 50 Gbp/s data rate per signal lane) has made this at least 0.064 mm reduction a criticality for pluggable optical modules. For example, a reduction in this module front-to-back nominal clearance length directly reduces the pad length of the connector (200) of the pluggable optical module (101), which directly improves the signal integrity of the pluggable optical module. Specifically, as discussed above as an example of such improvement, for QSFP modules, a pad length of 1.60 mm provides 28 Gbp/s data rate per signal lane while a lower pad length of 1.40 mm provides 112 Gbp/s data rate per signal lane.

Consequently, a reduction of at least 0.064 mm that used to be considered ignorable, may now be considered a criticality that results in an increase in the signal integrity of a pluggable optical module. As discussed above, such a criticality is a direct result of having the latch plane (311) be angled away from vertical at an angle between 3 to 15 degrees, which may reduce the module front-to-back nominal clearance by a value between 0.03 mm to 0.15 mm.

Additionally, in accordance to one or more embodiments disclosed herein, having the latch plane (311) be angled away from vertical at an angle between 3 to 15 degrees not only advantageously reduces the module front-to-back nominal clearance but also retains a sureness of an engagement between the latch (401) and the latch release (309) within the latching pocket (307). Said another way, having the latch plane (311) be angled away from vertical at an angle of between 3 to 15 rather than being perpendicular to the bottom surface (313) does not affect the ability for the cage (103) to securely retain the pluggable optical module (101), and there is no risk of the latch (401) self-loosening from within the latching pocket (307).

The advantages discussed above throughout the detailed description should be understood as being examples associated with one or more problems being solved by embodiments of the invention. However, one or more embodiments of the invention disclosed herein should not be limited to solving the same/similar problems. The disclosed invention is broadly applicable to address a range of problems beyond those discussed herein.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A pluggable optical module configured to be inserted into a cage, the pluggable optical module comprising:
   a casing;
   an optical connector at a first longitudinal end of the casing; and
   a printed circuit board held within an internal space of the casing that protrudes from a second longitudinal end of the casing, wherein the second longitudinal end is opposite of the first longitudinal end, and a portion of the printed circuit board protruding from the second longitudinal end of the casing,
   wherein the casing comprises:
      a first latching pocket disposed on a first side of the casing configured to receive a first latch of the cage; and a second latching pocket disposed on a second side of the casing configured to receive a second latch of the cage, wherein the second side is opposite to the first side, and wherein each of the first latching pocket and the second latching pocket comprises:

a latch plane configured to contact front terminal ends of a corresponding one of the first latch and the second latch; and a latch release that respectively releases the corresponding one of the first latch and the second latch from a corresponding one of the first latching pocket and the second latching pocket, wherein the latch plane is a surface on each of the first side of the casing and the second side of the casing that connects a top surface of each of the first latching pocket and the second latching pocket to a bottom surface of each of the first latching pocket and the second latching pocket, and wherein the latch plane is angled away from vertical at an angle between 3 and 15 degrees.

2. The pluggable optical module of claim 1, wherein the angle is between 4 and 8 degrees.

3. The pluggable optical module of claim 1, wherein the latch plane being angled away from vertical at the angle between 3 and 15 degrees reduces a module front-to-back nominal clearance by a value between 0.03 mm and 0.15 mm.

4. The pluggable optical module of claim 1, wherein the pluggable optical module comprises an Octal Small Form Pluggable (OSFP) module, a Quad Small Form-factor Pluggable (QSFP) module, or a Quad Small Form-factor Pluggable Double Density (QSFP-DD) module.

5. A pluggable optical module comprising:
a casing with an internal space;
a latching pocket disposed on a side wall of the casing; and
a latch plane on a surface of the latching pocket, wherein the surface is a beveled surface, wherein the beveled surface delimiting the latch plane has an angle between 3 and 15 degrees, wherein the pluggable optical module further comprises a printed circuit board held within the internal space of the casing, and wherein a portion of the printed circuit board protrudes from a longitudinal end of the casing.

6. The pluggable optical module of claim 5, wherein
the pluggable optical module is configured to be inserted into a cage comprising a latch that engages with a latch release of the latching pocket to retain the pluggable optical module within the cage, and
the latch plane contacts a front terminal end of the latch when the pluggable optical module is inserted into or removed from the cage.

7. The pluggable optical module of claim 6, wherein the angle is between 4 and 8 degrees.

8. The pluggable optical module of claim 5, wherein
the portion of the printed circuit board protruding from the longitudinal end of the casing comprises a module front-to-back nominal clearance.

9. The pluggable optical module of claim 8, wherein the beveled surface delimiting the latch plane has the angle between 3 to 15 degrees to reduce the module front-to-back nominal clearance by a value between 0.03 mm to 0.15 mm.

10. The pluggable optical module of claim 5, wherein the latching pocket comprises a top surface that is a surface of the side wall of the casing and a bottom surface deeper within the latching pocket than the top surface and wherein the latch plane extends between the top surface and the bottom surface.

11. The pluggable optical module of claim 5, wherein the casing is configured to mate with a cage for an Octal Small Form Pluggable (OSFP) module.

12. The pluggable optical module of claim 11, wherein the latch plane is configured to contact a terminal end of a latch of the cage for the OSFP module when the pluggable optical module is inserted into or removed from the cage.

13. A pluggable optical module comprising:
a casing with at least one longitudinal side wall; and
a latching pocket disposed on the at least one longitudinal side wall of the casing,
wherein the latching pocket comprises:
a top surface that is a surface of the longitudinal side wall of the casing;
a bottom surface deeper within the latching pocket than the top surface; and
a latch plane that connects the top surface with the bottom surface and that is angled away from vertical at an angle between 3 and 15 degrees.

14. The pluggable optical module of claim 13, further comprising:
a latch release that engages with a latch of a cage when the pluggable optical module is inserted into the cage to retain the pluggable optical module within the cage,
wherein the latch plane contacts a front terminal end of the latch when the pluggable optical module is inserted into or removed from the cage.

15. The pluggable optical module of claim 13, wherein the angle is between 4 and 8 degrees.

16. The pluggable optical module of claim 13, wherein
the pluggable optical module further comprises a printed circuit board held within an internal space of the casing,
a portion of the printed circuit board protrudes from a longitudinal end of the casing, and
the portion of the printed circuit board protruding from the longitudinal end of the casing comprises a module front-to-back nominal clearance.

17. The pluggable optical module of claim 16, wherein the latch plane being angled away from vertical at the angle between 3 and 15 degrees reduces the module front-to-back nominal clearance by a value between 0.03 mm and 0.15 mm.

18. The pluggable optical module of claim 13 further comprising:
an electrical connector, wherein the casing and the electrical connector at least in part configure the pluggable optical module as an Octal Small Form Pluggable (OSFP) module.

19. The pluggable optical module of claim 13, further comprising:
a latch release that extends along the longitudinal side wall of the casing and extends longitudinally beyond the latch plane to a terminal end.

* * * * *